Patented Oct. 19, 1943

2,332,219

UNITED STATES PATENT OFFICE 2,332,219

ROOFING AND SIDING MATERIAL AND PROCESS OF MAKING THE SAME

Norman P. Harshberger, Scarsdale, N. Y., assignor, by mesne assignments, to Carbide and Carbon Chemicals Corporation, New York, N. Y., a corporation of New York No Drawing. Application October 24, 1938, Serial No. 236,789

14 Claims (Cl. 117—21)

This invention relates to building material, particularly roofing and siding, generally fabricated in the form of shingle slabs or strips, roll roofing or paper for insulation purposes, and comprises methods of providing surfacings of metallic flakes for such materials, and the products thereof.

In my prior copending application Serial No. 32,723, filed July 23, 1935, now Patent No. 2,133,988, issued October 25, 1938, of which this application is a continuation-in-part, I have disclosed certain embodiments of roofing material of the aforesaid character, wherein a layer consisting principally of metallic particles, such as metallic flakes, also referred to as "powders" in the finer sizes, for instance, aluminum flakes, is applied to the exposed bituminous facing of a roofing sheet, which may also have a granule surfacing. The metallic flakes are applied under conditions such that the bitumen is in adhesive condition, and to form a continuous masking layer of overlapping flakes for the exposed bitumen, thus shielding the bitumen from the destructive action of sun and rain, providing better anchorage for the granules, covering the black color of the asphalt, and providing improved insulation, all as more particularly described in said copending application. I have also there disclosed the application of a further layer of mineral granules which are caused to penetrate the metallic layer and to become embedded in the bitumen, to obtain a mineral surfaced roofing sheet wherein the interstices of bitumen between the mineral granules are covered by a metallic light and heat reflecting or conducting layer.

In adapting the aforesaid processes to commercial operations involving continuously moving material, I have found that at times, particularly where the flakes were of fine size or contained a substantial portion of extremely fine particles, considerable dust was created and unless proper precautions were taken, as by the use of proper exhausting fans and hoods, there was always a possibility of the particles of metal dust charging the atmosphere. Sometimes these dust laden atmospheres cause explosions. Furthermore, some metal flakes, where the adhesive surface is not in proper condition at the time of application thereof, are not as securely anchored as they might be, and some particles are therefore sometimes lost during exposure. Moreover, it is difficult, in handling metallic flakes alone by commercial apparatus, to control the amount of metallic flakes applied to a surface.

I have discovered that the aforesaid dangers and problems may be substantially eliminated by the addition of certain materials to the metallic flakes in application, which act to attract the metallic dust and reduce the dust problem to a minimum, yet I am able to obtain, as before, continuous layers of overlapping metallic flakes that are equally protective. Moreover, I have also found that by the use of additions of a meltable or thermoplastic nature, additional bonding of the flakes to the base and to each other may be obtained, and that in certain cases water-insoluble and bitumen and weather-resistant films are formed over the base metallic layers and which exhibit further layers of such metallic material. I have further discovered that the added material acts as a spreading agent for the metallic flakes, aids in application of the metallic flakes and acts to control, within satisfactory ranges, the amount of metallic flakes applied to a given area by commercial equipment.

More particularly, it is an object of the invention to apply to a base metallic flakes, including a dust preventative addition mixed therewith, and under conditions such that the metallic particles become bonded to the base and produce a continuous layer of overlapping flakes.

Another object is to apply to a base a mixture of metallic flakes and a dry or dampened, finely divided solid dust mitigating agent.

It is a further object to provide a means of applying dry metallic flakes to an adhesive sheet whereby such particles not only become bonded to the adhesive, but are additionally bonded to each other by a further binding material applied simultaneously therewith.

A more specific object of the invention is to provide a dry, pulverized dispersing and dust reducing agent for metallic flakes intermixed with such flakes and to apply such material to a base under conditions whereby the dispersing agent becomes melted and aids in binding the overlapping metallic flakes to each other and to the base to which they are applied.

An additional object is to provide a bituminous structure having a layer of overlapping metallic flakes including a set film of molten particles of finely divided, thermoplastic, water-insoluble material, applied to the bituminous base intermixed with the metallic particles and providing additional weather resistance for the base and additional shielding protection for the bitumen.

It is another object of my invention to provide a mixture of metallic particles and a meltable dispersing agent in dry, pulverulent form, including additional aggregates of non-adhesive character which aid in the dispersing action and provide additional protection for the finished product.

Another object is to provide a pulverulent addition of a thermo-setting character for metallic flakes.

Other objects of the invention will appear from the following claims taken in conjunction with the description and examples which, however, must be considered as merely illustrating and in no way limiting the invention thereto.

According to my invention, metal particles, for instance, particles of aluminum, bronze, or other weather and corrosive resistant metallic materials in the form of flakes, sometimes referred to as metal or bronze powders, are mixed together with finely divided solid material adapted to act as a spreading agent for the metallic flakes, and to reduce to a minimum, due to their affinity for metallic flakes which readily adhere thereto, any tendency of the metallic flakes during processing to charge the atmosphere with dust. Aluminum flakes are preferred by reason of their low cost, characteristic silvery appearance, resistance to the effects of bitumens and oils, and their slight tarnishing by oxidation. They are further preferred because of their light weight and their light and heat reflective and conductive properties.

The solid added material may be prepared in a finely divided state, preferably between 150 to 250 mesh, and then uniformly dispersed through the metal flakes. Preferably, however, I reduce such solid material to small size and subsequently ball-mill this material together with the metallic flakes until a uniform mixture of metallic flakes and finely divided solid particles is obtained. I have found that, where the spreading agent is of a character to cause considerable lumping when ball-milling or dividing such material alone, the addition of metallic flakes in this operation has the effect of providing a separator for the particles of spreading material.

Among the materials I may mix with the metallic flakes are such substances as, for instance, heat resistant solids as asbestos rock, exfoliated vermiculite, and mica flakes. These may be added in such amount as will not materially effect the obtaining of a good metallic layer. For instance, 20% by volume of these materials will give improved application results, yet provide a fairly good covering of metallic flakes. By slightly wetting the added solids with water, or a suitable solvent, to dampen the surface thereof, and then mixing with the metallic flakes, the amount of added solids may be considerably reduced with good results. High melting point waxes, such as carnauba wax, also may be used as spreading agents and to reduce the metallic dust conditions.

Preferably, however, I utilize solid materials having the characteristic of becoming fluid and adhesive upon heating to temperatures sufficient to melt them and which float the metallic particles or preferably flow in and over the metallic and other aggregate particles and bond such particles to each other and to the surface they cover. These may be, for instance, particles of asphalt or pitch which, when they become fluid upon heating, permit such metal particles as may not otherwise be bonded, to float and form a continuous layer of exposed overlapping flakes. Obviously, when such a mixture is applied to a bitumen base, these bitumen additions will coalesce therewith and form, in effect, substantially homogeneous bitumen layers covered by a continuous layer of exposed metallic flakes. Natural or synthetic substantially water-insoluble resins, such as rosin, "Vinsol," copal, para-coumarone as "Cumar," and vinyl resins of low melting point, give better binding characteristics, form transparent and translucent films over the metallic flakes, and are resistant to bleeding of bitumen. Rosin is preferred because of its melting point akin to the high melting point asphalt coating common to roofing and to its rapid melting properties, also, because of its natural affinity to metallic flakes, its low specific gravity, its ease of handling, and its low cost. Thermoplastic resins, such as vinyl and acid phenol aldehyde resins, may also be utilized according to my invention, as can also phenol aldehyde resins of the thermo-setting type providing such resins are fluid at temperature below about 500° F. to enable the functioning of my invention with respect to a bituminous sheet without detriment thereto. It will be understood that mixtures of the aforesaid solids may be added to the flakes and that other aggregates such as fine asbestos fiber or mineral wool, vegetable fiber, roofing granules, titanium oxide or other coloring pigments, slate dust and aluminum dross, may be included.

The metallic flakes may be combined with the pulverized meltable spreading or adhesive agent and the two fused together by the application of heat with the addition of such other aggregates as may be desired and the molten material be permitted to set and harden. Subsequently, this material may be repulverized, and in such condition applied to a base as desired.

The solid mixture of metallic flakes and solid additions is applied to a composition roofing sheet or slab, generally a felted fibrous sheet made of rag and paper stock and/or asbestos, and saturated with a low melting point asphalt (150° F.) generally used at between 225° to 400° F. and subsequently coated on one or more of its faces and edges with a facing comprising higher melting point asphalt (220 F.), generally applied at 450° F. and which may be surfaced with mineral particles such as slate, sand, shale, crushed tile, silica, etc. The metallic mixture may be applied directly to the saturated sheet or to the further asphalt coated sheet or to the mineral surfaced sheet in such manner that the metal particles become bonded thereto to form a layer of flakes in overlapping relation. In general, this material is applied such that the metal particles will mask the exposed bitumen portions of the finished product in the area that is to be exposed when the material is laid. However, the application may be made over any portion or as many sides and edges of the base material as is desired, and it will further be understood that such application may be made, for example, over a mineral surfaced sheet to obtain novel, ornamental affects, as by blending the metal flakes with the mineral surfacing.

Generally, the metallic mixture will be applied to the base material immediately after saturating or coating with the hot bitumen so that a good adhesive bond is obtained for the metal and admixed particles. Where the spreading agent has a melting point below the temperature of the applied asphalt saturant or asphalt coating material, such as is the case with rosin, this material will, upon striking the sheet, become fluid and flow between and over the overlapping flakes bonded to the asphalt to form a fused coating or film of such material thereover. Moreover, a substantial amount of metallic flakes will be floated to the surface of the film to form additional laminations of overlapping flakes. Obviously, where it is necessary, the base material should be maintained at a temperature such that the spreading agent may become fluid. However, other methods, not so desirable, of bringing about the fluid condition for the spreading agent may be used. For instance, the solid metallic mixture may be applied to a cold sheet, which, as previously stated, may be an asphalt saturated one or an asphalt coated one, or a mineral surfaced asphalt coated sheet, and the sheet with its deposit of the mixture be passed through a heated tunnel or beneath a heating hood capable of transferring to the mixture sufficient heat to bring about melting of the spreading agent, or alternatively the mixture surfaced sheet may be gradually heated to a temperature such that the spreading agent becomes fluid and the bitumen which it covers is also made soft and adhesive.

The metallic mixture may be fed to the base material by any suitable means such as a hopper having a suitable outlet. However, I have found that a narrow hopper having sides converging to a narrow opening, between which is positioned a triangular bar adapted to rapidly oscillate in the direction of its axis, feeds uniform quantities of the metallic mixture, prevents jamming of the material in the hopper, and produces a minimum of dust. The downward converging faces of the oscillating bar are cut with a plurality of fine teeth (for instance, $\frac{1}{16}''$ pitch) which are normal to the axis of the bar, and these teeth operate in complementary grooves cut in the adjacent walls of the hopper. I have also found, where the mixture contains a spreading agent in dampened condition, that the material may readily be applied by means of a rotating impeller without creating a great deal of dust.

Obviously, the metallic mixture may be applied to one side of the asphalt treated sheet first and then applied to the opposite side, or a blank of the base material may be dipped into hot bitumen and subsequently contacted with a mass of the pulverant metallic mixture or have a quantity of such material sprinkled over the bitumen treated surface. Moreover, a bitumen mastic made up of asphalt and mineral filler material, which may include chopped up waste roofing, may also be treated by the aforesaid methods.

It is further to be understood that after application of the mixture, an additional surfacing of mineral granules may be applied and these pressed into the bituminous coating by penetrating the applied layer. This operation should be performed when the bitumen is in a plastic condition, and preferably while the spreading material is also fluid and adhesive, for in such manner the granules will be more securely anchored to the base. I have found that where such granule application utilizes aluminum dross in granule form having a size, for example, 8 or 10 mesh, an extremely durable product is obtained wherein the granules have a similar color to the metallic layer and an extremely large heat radiating surface is obtained. Moreover, these granules being extremely light in weight (slightly heavier than aluminum) reduce the overall weight of a resultant product. Moreover, these particles, being somewhat porous, obtain a good structural anchorage to the base adhesives. Also, by reason of their light weight, larger granules may be used than have heretofore been possible in the manufacture of prepared roofing, thus giving further heat radiation surface and yet making a finished product of no greater weight than that formerly produced. In fact, the use of aluminum dross granules constitutes a feature of my invention which may be employed separate and apart from the other features which have heretofore been described. I am not aware that such material has ever heretofore been used as a roofing granule.

The relative proportions of metallic flakes and solid spreading agents to be used will depend more particularly upon the character of the agent or mixture thereof, size of the particles, the temperature necessary to make the spreading agent fluid, if such be possible, and upon the specific results desired. The proper proportions of materials to be employed may readily be determined with a little experience for each condition of use.

I have previously indicated that, where the spreading material is of a solid character below 500° F., roughly 20% by volume of the spreading agent may be used with the metallic flakes. However, where the spreading agent is fluid below this temperature, such as when this material readily flows at the temperatures of hot molten bitumen, the proportions of ingredients may widely vary. Thus, for example, I have been able to employ as much as 20 parts by weight of spreading agent to one part of metallic flakes, yet obtain a finished product wherein there is a layer of metallic flakes bonded to the bitumen, and an additional layer or layers of flakes at the surface of the film of molten spreading agent. The reason for this may be apparent from the fact that metallic flakes have exceedingly high covering power, for example, 100 grams of aluminum will readily cover 300 square feet of bitumen surfaced roofing, and that where the portion of covering agent is made large, it merely increases the relative thickness of the film that is formed over the metallic particles bonded to the bitumen and makes possible a greater multiplicity of laminations of metal particles within said film.

In order that those skilled in the art may have some indication of the possibilities of this invention, I am providing the following examples of structures made in accordance with my invention and which are representative of satisfactory practice for general purposes.

*Example No. 1*

Ball-mill 5 parts by weight of dry aluminum flakes with 95 parts of dry and solid water white rosin until a fine mixture is obtained, in which the aluminum flakes are uniformly dispersed and the rosin is finely ground to a size in the order of 150 to 250 mesh. A fibrous base is provided saturated with a low melting point asphalt (150° melting point) and such base is preferably one in which the fibrous pulp, prior to formation of the sheet, has been treated with or has had included therein, a potato starch solution of sufficient starch concentration such that the base, after saturation and pressing, will exhibit considerable stiffness and toughness. To this base is applied a liquid coating of a 220° F. melting point steam reduced asphalt and at a temperature between 400° to 450° F. While the coating is in this heated and plastic condition, it is moved to a hopper device containing the aforesaid metallic mixture, and such material is uniformly spread over the hot asphalt to produce a uniform layer of overlapping metallic flakes with dispersed rosin particles. The aluminum flakes contacting the bitumen adhere thereto and the rosin particles immediately begin to soften and flow, due to the heat absorbed from the asphalt. Upon becoming fluid, the rosin spreads into a substantially continuous film penetrating the cleavages between lapping metallic flakes adhered to the asphalt and coating the upper surface thereof. Such aluminum flakes as have not become adhered to the asphalt, float to the surface and form secondary layers of overlapping metallic flakes. The sheet is then cooled and the rosin and asphalt permitted to set. A coated base of this character may be directly exposed to the weather as the asphalt is fully protected by a laminated metallic shield, as well as by a coating film of water-insoluble character that further resists any bleeding of the bitumen and which aids materially in bonding the metallic particles to the asphalt and to each other.

*Example No. 2*

A base is prepared in accordance with Example No. 1, and when the rosin has become fluid the sheet is moved to a hopper containing quartz or ceramic granules (8 to 10 mesh), and these are fed to the metallic surfaced sheet in a uniform layer and are partially embedded by suitable means in the asphaltic layer by causing the granules to penetrate the metallic layer and rosin film. It will be understood that at the time of this operation the bitumen should be still in a plastic and adhesive condition. It will also be appreciated that, in the operation of pressing the granules, a certain amount of metal flakes and rosin will be carried down with the granules so that, in effect, the shielding layer, at least in plane, is still continuous. Thereafter, the coatings are permitted to set. In this manner, a rough textured granule surface is obtained in which the granules are securely anchored by the asphalt and rosin and the asphalt is protected from direct action of the sun's rays by the metallic layers. The metallic layer, as well as the rosin film, also protects the asphalt from the action of such rays as are magnified by the granules, which are translucent in character and, moreover, such layers also protect the granules from discoloration by the underlying bitumen.

*Example No. 3*

A base is prepared in accordance with Example No. 1, and the mixture of metallic flakes and rosin is applied thereto immediately after asphalt saturation of the web.

*Example No. 4*

A base is prepared in accordance with Example No. 1 and a mixture comprising by weight, 1 part aluminum flakes, 10 parts rosin, and 200 parts of aluminum coated granules of approximately 11 mesh, is applied over the molten asphalt coating to form a uniform layer and in a manner as to partially embed the aluminum coated granules in the underlying asphalt. This may be done by passing the coated web in contact with a wetted roll with slight pressure. By this method, a great amount of the rosin and aluminum flakes of the mixture will extend over the exposed granules, thereby adding further protection to the base and granules. Moreover, a rough textured sheet is obtained in which the entire surface is of metallic character. Furthermore, by this method of application, the reflective power of the aluminum coated granules is somewhat dulled by the rosin film and this is desirable in many instances from an ornamental standpoint.

*Example No. 5*

A mixture is prepared in accordance with Example No. 1, using 2 parts of aluminum flakes, 5 parts of rosin, 1 part of asbestos fiber, and this is applied to a base made of a bitumen mastic including chopped up waste roofing and mineral fillers. The mixture may be applied directly to the surface of the mastic while still in a plastic state, or the mastic may be given a further coating of high melting point asphalt (220° melting point) and the metallic mixture applied thereto.

*Example No. 6*

A fiber base made in accordance with Example No. 1 is dipped into a bath of molten asphalt (220° melting point) having a temperature between 400° to 450° F. and which contains a filler of finely divided aluminum dross (250 to 350 mesh) up to 50% by weight of the asphalt. The coated base, while the bitumen is still plastic, is treated with a mixture of 1 part aluminum flakes and 8 parts of rosin to cover the faces and edges thereof and the coated base is permitted to set, whereupon a continuous metallic layer of overlapping flakes will be obtained, securely bonded to the asphalt and further bonded by the rosin film. The aluminum dross has the advantage of bulking the bitumen on a weight for weight basis more extensively than other known fillers.

*Example No. 7*

A base is prepared in accordance with Example No. 1 and to it is applied a mixture consisting of 3 parts aluminum flakes, 15 parts of mica, 15 parts of cumaron resin, and 400 parts of #26 silica granules. The mixture is applied to the hot bitumen of the base in a layer from $\frac{1}{32}''$ to $\frac{1}{4}''$ thick. The material is preferably slightly pressed before the uppermost resin begins to flow, and sufficient heat is provided such that the entire resin content of the surfacing becomes fluid and bonded to the aggregate and to the bitumen.

*Example No. 8*

A base is prepared of an aqueous rag and paper pulp including a sulphonated or resinous emulsion in amount from 1% to 5% by weight of the dry pulp. The pulp is felted in the well-known manner into a sheet and dried. The sheet is thereafter treated with hot bitumen saturant, producing a reaction between the bitumen and the residue of the emulsion with resultant hardening and stiffening of the sheet. Thereafter, a further coating of high melting point asphalt (220° F. melting point) is applied at a temperature of between 400° to 450° F., and this is surfaced with a mixture consisting of equal parts by volume of bronze flakes and finely divided light colored asphalt, which has been brought to such state while in a solid and chilled condition. Sufficient heat is provided to cause the granulated asphalt to melt and a structure is produced wherein a continuous layer of metallic flakes is fused and bonded to the base coating of asphalt and an additional layer of metallic flakes remains on the surface of the molten asphalt granules to form an exposed metallic layer.

It will be understood that in the foregoing examples, bronze flakes may be substituted for the aluminum flakes and vice versa, and that other of the spreading agents set forth in the foregoing description, may be substituted for the rosin. Of course, certain of these will require more or less heat to accomplish the result and the resultant product may have somewhat different weathering and bonding characteristics from those in the examples.

From the foregoing description and examples, it will be seen that I have provided new and novel structures providing layers of overlapping metallic flakes and new and novel processes of applying such flakes to bitumen faced material.

The aforesaid processes are to be distinguished from a process involving the utilization of a metallic paint for such paints utilize considerable quantities of oil and solvent, which is clearly avoided in the aforesaid processes. Moreover, by the aforesaid processes, layers of considerable thickness of metallic material may be obtained in a single application to manufactured roofing, whereas such would require many applications in the case of paints for the amount of volatiles to be evaporated would be too excessive where layers of any substantial thickness were to be obtained in a single application. Moreover, unless costly, high grade paints are employed, the applied film will readily check and peel.

However, in my experience with metallic paints, I have found that such may be best utilized and a degree of additional protection obtained where, in connection with the manufacture of bituminous roofing, the paint, preferably in the form of a phenolic varnish, is applied directly to the bitumen while in a hot and plastic condition and a surfacing of mineral granules is immediately thereafter applied and embedded in the plastic bitumen and the metallic varnish. By such an operation, the high heat of the bitumen causes a rapid upward movement of the solvents of the metallic paint and these carry a substantial percentage of the metallic powders to the base of the granules as they are applied, thereby coating the under surface of the granules with metal and oils. When the coating has dried, the under surface of the granules will be protected by the metallic coating, thus preventing moisture from getting into the bitumen through the granules to cause blistering. Also, the granule is bonded both by the paint film and bitumen.

It will be understood that various modifications may be made in the structures and processes of my invention without departing from the spirit thereof. I therefore desire to secure for myself, all modifications, and equivalent constructions and processes within the scope of the following claims and as construed by the prior art.

I claim:

1. The process of making roofing and siding comprising providing a base, applying to said base a coating of molten asphalt having a temperature in excess of 400° F., preparing a mixture comprising metallic flakes and finely divided particles of meltable adhesive agent having a melting point substantially under 400° F., and between 150 to 250 mesh in size, applying said mixture to the hot asphalt whereby metallic flakes become bonded thereto in a continuous layer and the meltable material becomes fluid and aids in bonding the metallic flakes in the finished structure.

2. The process of making roofing and siding, which comprises providing a base sheet, applying to said sheet a coating of hot bitumen, preparing a mixture comprising aluminum flakes and finely divided rosin and applying said mixture to said bitumen while said bitumen is sufficiently hot and adhesive such that the contacting metallic flakes become bonded to said bitumen to form a continuous layer of overlapping flakes and the rosin becomes melted and forms a layer comprising aluminum flakes overlying the base bitumen and aluminum layer bonded thereto.

3. The process of making building material comprising providing a base, coating said base with a hot bitumen, applying to said bitumen a mixture comprising metallic particles, mineral granules, and finely divided particles of a solid meltable adhesive material of a melting point below 500° F., applying said mixture to the base bitumen while said bitumen is adhesive and sufficiently hot to render said solid meltable material fluid and pressing said granules, said metallic flakes and mineral granules becoming bonded to the bitumen and said solid meltable material becoming fluid and forming a continuous metallic surfaced layer aiding in the bond of said bitumen bonded metallic flakes to said base bitumen and to each other.

4. The process comprising coating a base with a hot bitumen, applying to said base a mixture comprising metallic flakes and a finely divided meltable solid adhesive material of a melting point below 500° F., applying said mixture while said bitumen is hot and adhesive such that the metal flakes become bonded to the bitumen and the meltable material becomes fluid, and subsequently while the bitumen is still plastic and the meltable material is still fluid applying a surfacing of interspersed granular material, and partially embedding said ganular material in said bitumen and meltable material.

5. Roofing and siding comprising a base having a facing of bituminous material and a substantially continuous coating fused and bonded on said bituminous facing and comprising metallic flakes combined with adhesive material selected from the group consisting of bitumen, resins and waxes, said coating having a substantial amount of its metallic flakes bonded by said bituminous material on the base and forming a layer thereon, and having others presenting an exposed surfacing for said coating.

6. Roofing and siding comprising a base having a facing of bituminous material and a substantially continuous coating fused and bonded on said bituminous facing and comprising a light transmitting resin combined with metallic flakes, said coating having some of its metallic flakes bonded by said bituminous material on the base and forming a layer thereon, and having others presenting an exposed surfacing for said coating and said resin permitting exposure therethrough of its underlying metallic flakes.

7. Roofing and siding comprising a base having a facing of bituminous material and a substantially continuous coating fused and bonded on said bituminous facing and comprising rosin combined with metallic flakes, said coating having some of its metallic flakes bonded by said bituminous material on the base and forming a layer thereon, and having others presenting an exposed surfacing for said coating.

8. Roofing and siding comprising a base having a facing of bituminous material and a substantially continuous coating fused and bonded on said bituminous material and comprising water-insoluble synthetic resin combined with metallic flakes, said coating having some of its metallic flakes bonded by said bituminous material on the base and forming a layer thereon, and having others presenting an exposed surfacing for said coating.

9. Roofing and siding comprising a base having a facing of bituminous material and a substantially continuous coating fused and bonded on said bituminous material and comprising bitumen of light color combined with metallic flakes, said coating having some of its metallic flakes bonded by said underlying bituminous material on the base and forming a layer thereon, and having others presenting an exposed surfacing for said coating.

10. Roofing and siding comprising a base having a facing of bitumen and a substantially continuous fused coating on said bitumen comprising light-transmitting adhesive material having a melting point below 500° F., combined with metallic flakes and interspersed individual granules, said coating having said granules and some of its metallic flakes bonded as a layer by said bitumen and additionally bonded by said fused material and having an exposed surfacing of said flakes between the granules.

11. Roofing and siding comprising a base having a facing of bituminous material and a substantially continuous fused coating on said bitumen comprising adhesive material of a melting point below 500° F. combined with metallic flakes; there also being interspersed metallic coated granules bonded by said bitumen and fused material, and said base presenting a surface to be exposed of wholly metallic character and of rough texture.

12. The process of making roofing and siding comprising treating a base with a waterproof adhesive substance, applying a coating comprising intermixed metallic flakes and a particulate adhesive substance of a melting point below 500° F., over said waterproof substance while the same is adhesive and heated to a temperature greater than the melting point of said particulate adhesive substance, the contacting metallic flakes of said coating forming a layer bonded thereto, and melting said particulate substance by the heat of said waterproof substance to additionally bond said adhesive bonded flakes and produce a surfacing of metallic flakes over said melted substance.

13. The process of making roofing and siding comprising preparing a mixture comprising metallic flakes and a particulate adhesive substance having a melting point below 500° F., treating a base with hot bitumen having a temperature above the melting point of said particulate substance, applying a coating of said mixture over said hot bitumen and melting said particulate substance by the heat of said bitumen, some of said metallic flakes being bonded by said bitumen and others presenting an exposed surfacing for said coating.

14. In the process of making roofing and siding by coating a base with a metallic layer, the improvement which comprises dividing a solid fusible substance selected from the group consisting of bitumen, resins and waxes, into fine particulate form while mixed with metallic flakes, heating said base to a temperature greater than the melting point of said solid fusible substance, applying the metallic-particulate mixture to said base, and melting said fusible substance by the heat of said base.

NORMAN P. HARSHBERGER.